United States Patent
Yang et al.

(10) Patent No.: US 9,612,492 B2
(45) Date of Patent: Apr. 4, 2017

(54) BORDER MASKING STRUCTURES FOR LIQUID CRYSTAL DISPLAY

(71) Applicant: Apple Inc., Cupertino, CA (US)

(72) Inventors: Byung Duk Yang, Cupertino, CA (US); Kyung-Wook Kim, Cupertino, CA (US); Shih-Chang Chang, Cupertino, CA (US); Hiroshi Osawa, Sunnyvale, CA (US); Hirokazu Yamagata, Tokyo (JP); Daisuke Nozu, Saitama (JP)

(73) Assignee: Apple Inc., Cupertino, CA (US)

(*) Notice: Subject to any disclaimer, the term of this patent is extended or adjusted under 35 U.S.C. 154(b) by 154 days.

(21) Appl. No.: 14/164,026

(22) Filed: Jan. 24, 2014

(65) Prior Publication Data

US 2015/0146144 A1 May 28, 2015

Related U.S. Application Data

(60) Provisional application No. 61/909,276, filed on Nov. 26, 2013.

(51) Int. Cl.
  *G02F 1/1362* (2006.01)
  *G02F 1/1335* (2006.01)
(52) U.S. Cl.
  CPC .. *G02F 1/136209* (2013.01); *G02F 1/133512* (2013.01)
(58) Field of Classification Search
  CPC ......... G02F 1/133512; G02F 1/133514; G02F 2001/136222; G02F 2001/133342; G02F 1/136209
  See application file for complete search history.

(56) References Cited

U.S. PATENT DOCUMENTS

| | | | |
|---|---|---|---|
| 6,331,473 B1* | 12/2001 | Hirabayashi | .............. 438/455 |
| 6,815,887 B2 | 11/2004 | Lee et al. | |
| 7,663,302 B2 | 2/2010 | Shin et al. | |
| 7,781,348 B2 | 8/2010 | Lee et al. | |
| 8,362,469 B2 | 1/2013 | Suh | |

(Continued)

FOREIGN PATENT DOCUMENTS

| | | |
|---|---|---|
| CN | 101452150 | 6/2009 |
| CN | 204101851 | 1/2015 |

(Continued)

*Primary Examiner* — Kendrick Hsu
(74) *Attorney, Agent, or Firm* — Treyz Law Group, P.C.; G. Victor Treyz; Zachary D. Hadd (57) ABSTRACT

A display may have a thin-film transistor layer and color filter layer. The display may have an active area and an inactive border area. Light blocking structures in the inactive area may prevent stray backlight from a backlight light guide plate from leaking out of the display. The thin-film transistor layer may have a clear substrate, a patterned black masking layer on the clear substrate, a clear planarization layer on the black masking layer, and a layer of thin-film transistor circuitry on the clear planarization layer. The black masking layer may be formed from black photoimageable polyimide. The clear planarization layer may be formed from spin-on glass. The light blocking structures may include a first layer formed from a portion of the black masking layer and a second layer such as a layer of black tape on the underside of the color filter layer.

18 Claims, 8 Drawing Sheets

(56) References Cited

U.S. PATENT DOCUMENTS

| | | | |
|---|---|---|---|
| 2004/0263711 A1* | 12/2004 | Matsumoto et al. | 349/44 |
| 2006/0001823 A1* | 1/2006 | Shih | G02F 1/133512 349/153 |
| 2007/0035473 A1* | 2/2007 | Yamazaki et al. | 345/4 |
| 2009/0147174 A1* | 6/2009 | Ha et al. | 349/58 |
| 2011/0063550 A1 | 3/2011 | Gettemy et al. | |
| 2012/0218696 A1* | 8/2012 | Kim et al. | 361/679.01 |
| 2013/0154949 A1 | 6/2013 | Jamshidi Roudbari et al. | |
| 2013/0187162 A1* | 7/2013 | Miwa | 257/57 |
| 2013/0235611 A1 | 9/2013 | Franklin et al. | |
| 2013/0250202 A1 | 9/2013 | Qi et al. | |
| 2015/0179668 A1* | 6/2015 | Niu | G02F 1/136209 257/72 |

FOREIGN PATENT DOCUMENTS

| | | |
|---|---|---|
| EP | 1324405 | 7/2003 |
| EP | 1748507 | 1/2007 |
| EP | 2273576 | 1/2011 |
| EP | 2284899 | 2/2011 |
| KR | 20-0270468 | 4/2002 |
| TW | 201341901 | 10/2013 |
| WO | 2013142215 | 9/2013 |

\* cited by examiner

BORDER MASKING STRUCTURES FOR LIQUID CRYSTAL DISPLAY

This application claims the benefit of provisional patent application No. 61/909,276, filed Nov. 26, 2013, which is hereby incorporated by reference herein in its entirety.

BACKGROUND

This relates generally to electronic devices and, more particularly, to electronic devices with displays.

Electronic devices often include displays. For example, cellular telephones, computers, and televisions have displays.

A display such as a liquid crystal display has an active area filled with an array of display pixels. The active area is surrounded by an inactive border area. It may be desirable to minimize or eliminate the use of unsightly bezel structures in the inactive border area. In displays with small bezels or no bezels, there is a risk that backlight can leak through the inactive border area. If care is not taken, stray backlight will undesirably lighten the inactive area.

It would therefore be desirable to be able to provide improved light blocking structures for inactive border regions in displays such as liquid crystal displays.

SUMMARY

An electronic device may be provided with a display such as a liquid crystal display. The liquid crystal display may have an upper polarizer and a lower polarizer. A layer of liquid crystal material may be interposed between a thin-film transistor layer and a color filter layer. The thin-film transistor layer may be interposed between the liquid crystal layer and the upper polarizer. The color filter layer may be interposed between the liquid crystal layer and the lower polarizer.

The thin-film transistor layer and color filter layer may have an associated array of display pixels that define an active area for the display. The display pixels of the active area may be used to display images for a user. An inactive border area in the display may run along the periphery of the active area. Light blocking structures in the inactive area may prevent stray backlight from a backlight light guide plate from leaking out of the display.

The thin-film transistor layer may have a clear substrate, a patterned black masking layer on the clear substrate, a clear planarization layer on the black masking layer, and a layer of thin-film transistor circuitry on the clear planarization layer. The black masking layer may be formed from black photoimageable polyimide. The clear planarization layer may be formed from spin-on glass. The light blocking structures may include a first layer formed from a portion of the black masking layer in the inactive area and may include a second layer such as a layer of black tape on the underside of the color filter layer adjacent to the lower polarizer.

DETAILED DESCRIPTION

Illustrative electronic devices of the types that may be provided with displays are shown in FIGS. 1, 2, 3, and 4.

Figure 1:
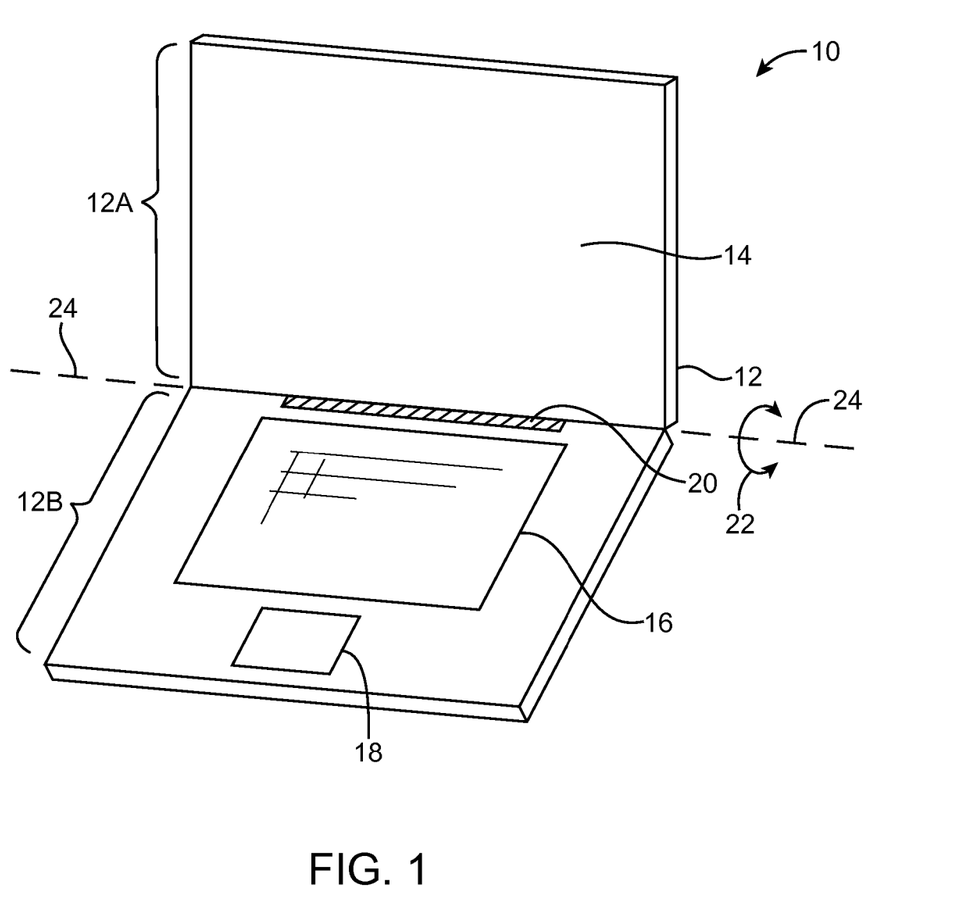
FIG. 1 is a perspective view of an illustrative electronic device such as a laptop computer with a display in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
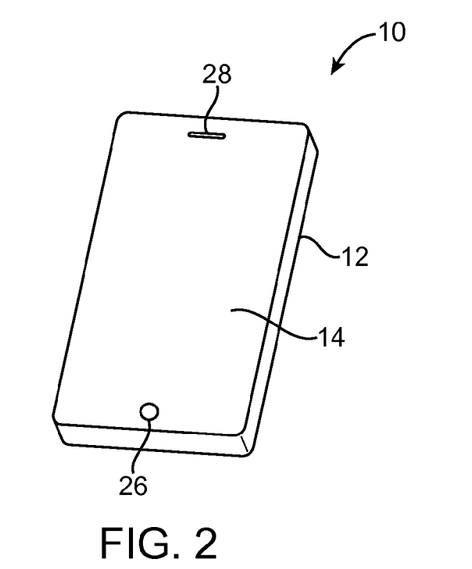
FIG. 2 is a perspective view of an illustrative electronic device such as a handheld electronic device with a display in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 28. Device 10 may, if desired, be a compact device such as a wrist-mounted device or pendant device (as examples).

Figure 3:
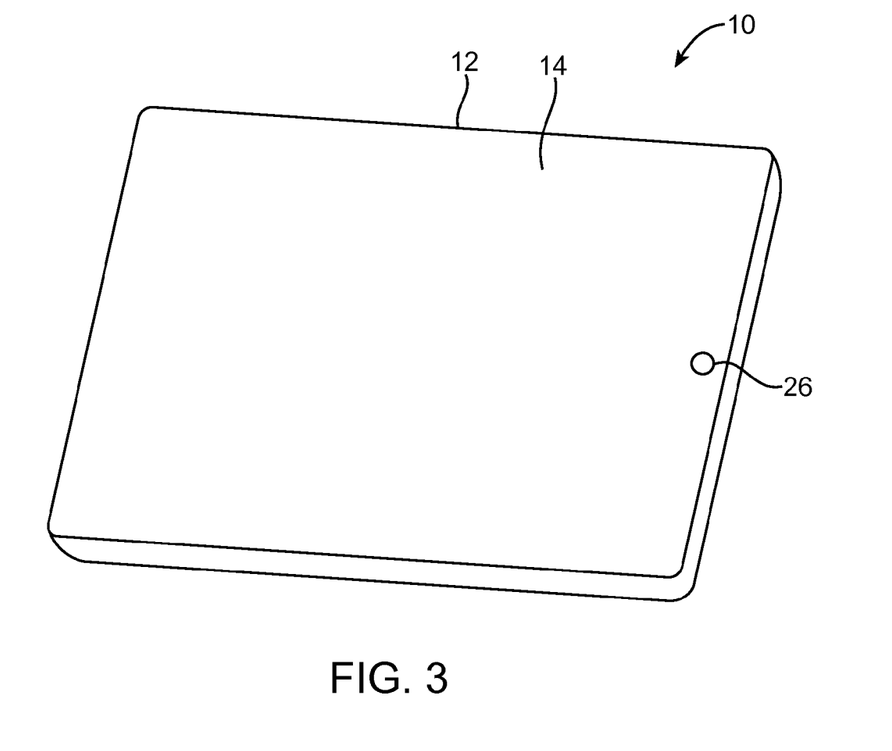
FIG. 3 is a perspective view of an illustrative electronic device such as a tablet computer with a display in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
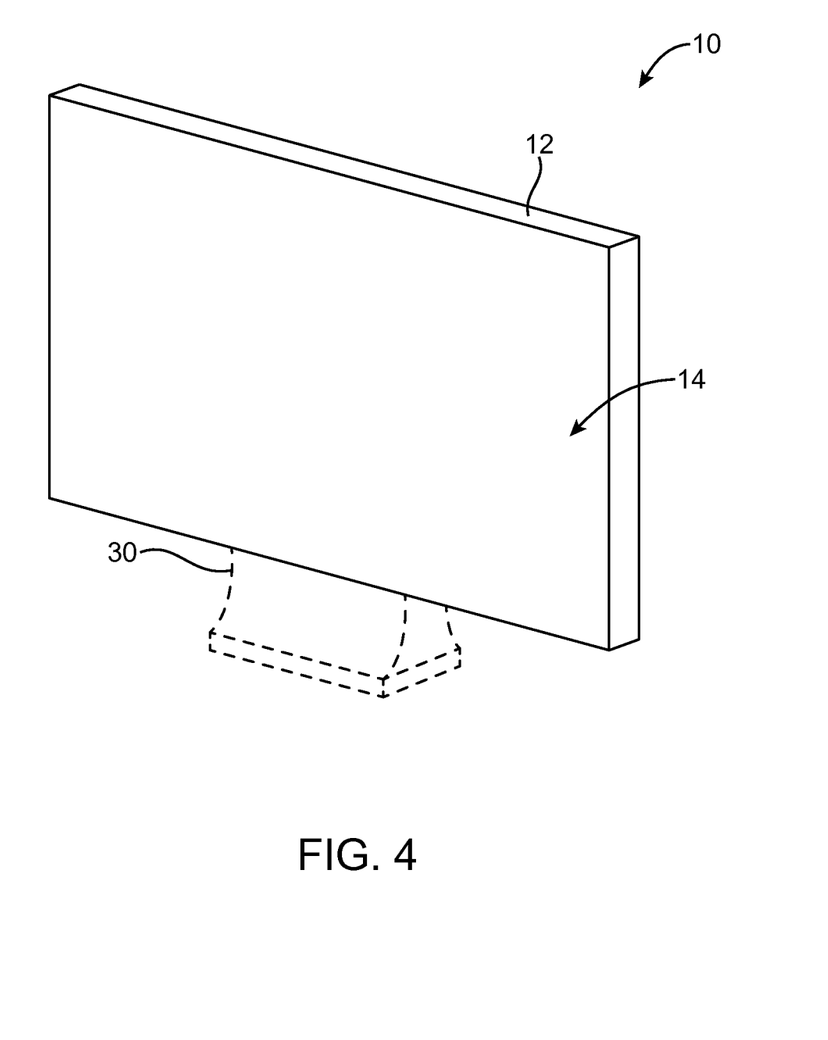
FIG. 4 is a perspective view of an illustrative electronic device such as a display for a computer or television with a display in accordance with an embodiment.

FIG. 4 shows an illustrative configuration for electronic device 10 in which device 10 is a computer display, a computer that has an integrated computer display, or a television. Display 14 is mounted on a front face of housing 12. With this type of arrangement, housing 12 for device 10 may be mounted on a wall or may have an optional structure such as support stand 30 to support device 10 on a flat surface such as a table or desk.

Figure 5:
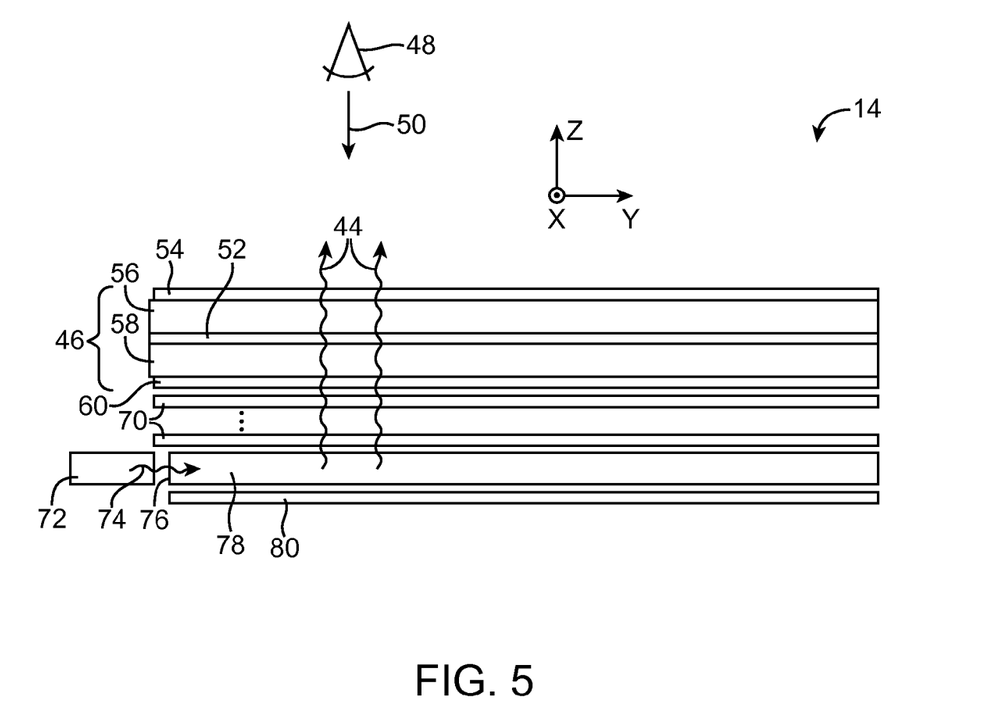
FIG. 5 is a cross-sectional side view of an illustrative display in accordance with an embodiment.

Display 14 may be a liquid crystal display or a display formed using other suitable display technologies. A cross-sectional side view of an illustrative configuration for display 14 of device 10 (e.g., a liquid crystal display for the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion of housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower (innermost) polarizer layer 60 and upper (outermost) polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, outer substrate layer 56 may be a thin-film transistor layer that includes an array of thin-film transistors and associated electrodes (display pixel electrodes) for applying electric fields to liquid crystal layer 52 and thereby displaying images on display 14. Inner substrate layer 58 may be a color filter layer that includes an array of color filter elements for providing display 14 with the ability to display color images.

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Display 14 may have an array of display pixels (e.g., a rectangular array having rows and columns) for displaying images to a viewer. Vertical signal lines called data lines may be used to carry display data to respective columns of display pixels. Horizontal signal lines called gate lines may be used to carry gate line signals (sometimes referred to as gate control signals or gate signals) to respective rows of display pixels. The outline of the array of display pixels in display 14 defines an active area for display 14. The active area may have a rectangular shape and may be surrounded by an inactive border region. An inactive border area may, for example, run along one edge, two edges, three edges, or all four edges of the active area.

Figure 6:
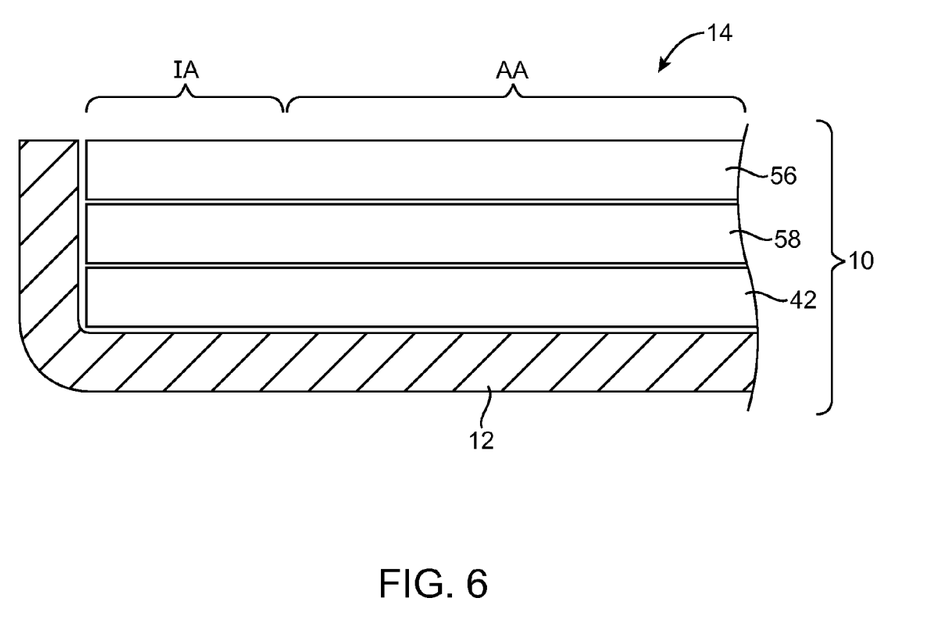
FIG. 6 is a cross-sectional side view of a portion of an illustrative electronic device showing how an edge of a display in the device may be free of overlapping housing structures in accordance with an embodiment.

A cross-sectional side view of an illustrative electronic device having a display such as display 14 of FIG. 5 is shown in FIG. 6. As shown in FIG. 6, images may be displayed on central active area AA of display 14. Inactive area IA may have a rectangular ring shape that runs around the rectangular periphery of active area AA. To avoid unsightly bezel structures in device 10, it may be desirable to keep inactive area IA free of overlapping housing structures, bezels, or other potentially unattractive border structures.

To avoid light leakage in inactive area IA (e.g., to prevent stray light from escaping in the absence of a bezel or other overlapping structure), display 14 may be provided with border masking structures in inactive area IA. The border masking structures may help block stray backlight from backlight unit 42 and thereby ensure that border IA does not allow excess light to escape. Backlight from backlight unit 42 will therefore be confined to active area AA.

To provide satisfactory light blocking capabilities in inactive area IA, light blocking structures can be formed in two parts (e.g., two layers). A first part of the light blocking structures may be formed from a black masking layer on the underside of thin-film transistor layer 56. In active area AA, the black masking layer may be patterned to form a black mask. The black mask is a grid-shaped series of intersecting black lines that define a rectangular array of clear display pixel openings in the thin-film transistor layer. Each of the openings in the black mask is aligned with a respective color filter element in a corresponding array of color filter elements on color filter layer 58. The grid-shaped black mask on the thin-film transistor layer may sometimes be referred to as a black matrix. In inactive area IA, the black mask may form the first part of the light blocking structures. The second part of the light blocking structures may be formed from opaque structures on the underside of color filter layer 58 such as a layer of black tape in inactive area IA.

Figure 7:
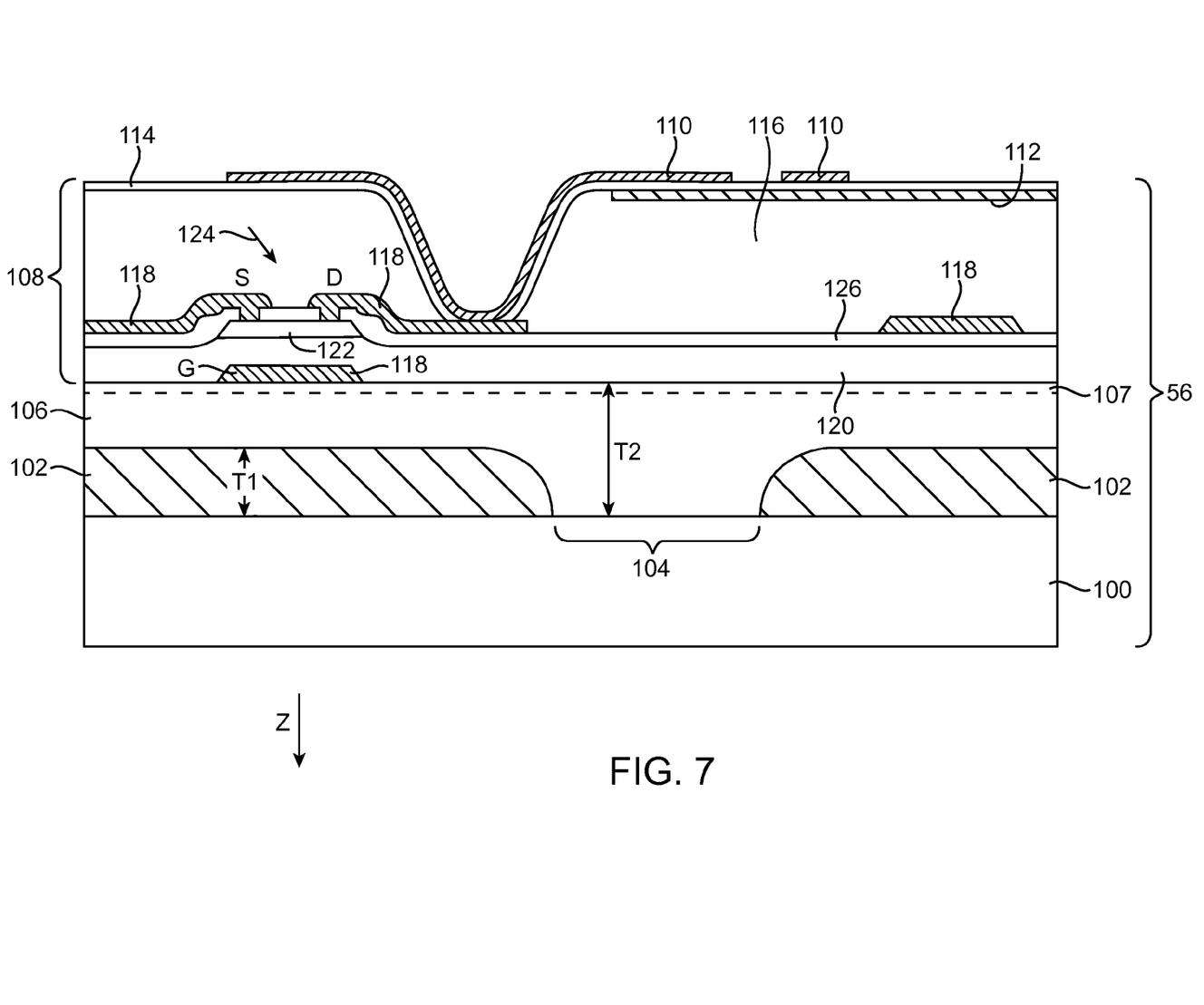
FIG. 7 is a cross-sectional side view of structures and thin-film circuitry that may be formed on a thin-film transistor layer in an illustrative display in accordance with an embodiment.

FIG. 7 is a cross-sectional side view of a portion of thin-film transistor layer 56 showing layers of structures that may be formed on thin-film transistor layer 56. As shown in FIG. 7, thin-film transistor layer 56 may include a transparent thin-film transistor substrate such as substrate 100. Substrate 100 may be formed from a clear planar structure such as a sheet of transparent plastic, transparent glass, or other clear substrate layer. Black masking layer 102 may be patterned to form a black matrix in active area AA of display 14 and may be patterned to form part of a light-blocking black mask border in inactive area IA. The portion of display 14 that is shown in FIG. 7 corresponds to a display pixel in the array of display pixels in inactive area AA. As shown in FIG. 7, black masking layer 102 may be patterned to form display pixel openings such as opening 104 that are aligned with patterned display pixel electrodes 110. Electrodes 110 may be separated from common electrode (Vcom) trace 112 by dielectric layer 114. Clear overcoat layer 116 may be formed on top of thin-film transistor 124 from a photoimageable polymer or other dielectric. Patterned metal 118 may be used to form transistor terminals such as source S, drain D, and gate G. Gate insulator 120 may be formed from dielectric materials such as silicon nitride and/or silicon oxide and may separate gate G from semiconductor region 122. Semiconductor region 122, which is used in forming the channel region for thin-film transistor 124, may be formed from semiconductor materials such as amorphous silicon, polysilicon, indium gallium zinc oxide, or other semiconductors. Passivation layer 126 may be formed on top of gate insulator 120.

Black masking material 102 may be formed from a photoimageable material such as black photoresist. The black photoresist may be formed from a polymer such as polyimide. To withstand the elevated temperatures involved in subsequent thin-film transistor fabrication steps, the polymer that is used in forming black masking material 102 preferably can withstand elevated temperatures (e.g., temperatures of 350° C. or higher or other suitable elevated temperatures). Opaque filler materials such as carbon black and/or titanium black may be incorporated into the polyimide or other polymer of layer 102, so that layer 102 is opaque and is able to block at least part of the stray light in inactive area IA.

Planarization layer 106 is used to planarize black masking layer 102 so that thin-film transistor circuitry such as transistor 124 can be formed on black masking layer 102 (i.e., so that thin-film transistors can overlap black mask 102 as shown in FIG. 7). With one suitable arrangement, planarization layer 106 is formed from a black mask compatible material having a low dielectric constant such as a spin-on glass. For example, planarization layer 106 may be formed from a spin-on glass such as a silicon oxide based spin-on glass (e.g., a silicate spin-on glass). During thin-film transistor formation, the structures of FIG. 7 may be subjected to elevated processing temperatures (e.g., temperatures of 350° C. or higher). Polyimide black mask layer 102 and spin-on glass planarization layer 106 are preferably able to withstand processing at these elevated temperatures (i.e., spin-on glass layer 106 will not experience diminished transparency and polyimide layer 102 will not degrade).

In some embodiments, a buffer layer such as inorganic buffer layer 107 may be formed at the interface between planarization layer 106 and TFT layers 108. Buffer layer 107 may be a thin layer of silicon nitride, silicon oxide, and/or other inorganic materials having a thickness of 250-3000 angstroms (as an example). Formed in this way, inorganic buffer layer 107 may serve to prevent chemicals such as etching solution from being injected into spin-on glass planarization layer 106 during formation of the TFT circuitry in layers 108.

It is desirable to limit the amount of opaque filler in material 102, as too much filler material may cause the resistivity of layer 102 to drop to an undesirably low level, potentially interfering with satisfactory operation of the thin-film transistor circuitry formed on thin-film transistor layer 56. When the amount of opaque filler is limited, the opacity for the black mask layer in inactive border IA will also be limited. The thickness T1 of black masking layer 102 can be increased somewhat to increase optical density (opacity) for layer 102, but excessive thicknesses for black masking layer 102 should generally be avoided. If black masking layer 102 is too thick, it may be difficult to planarize black masking layer 102 satisfactorily. In addition, excessive thickness T2 in the associated planarization layer may create an undesired color cast in the active area of display 14 and/or may reduce light transmittance in the active area of display 14. Excessive values for thicknesses T1 and T2 may also lead to cracking in layers 102 and/or 106 (e.g., cracks may develop due to imperfect matching between the coefficients of thermal expansion for the materials of layers 102 and 106).

In view of these constraints, it may be desirable to limit the thickness T1 of black mask layer 102 to a small value (e.g., about 1.5 microns, less than 2 microns, 1-2 microns, less than 3 microns, or other suitable value). Thickness T2 may then be limited to a comparably small thickness value. For example, thickness T2 of planarization layer 106 may be about 3 microns, less than 5 microns, 2-5 microns, less than 4 microns, less than 3 microns, or other suitable value).

In configurations for display 14 in which thickness T1 of black masking layer 102 is relatively small and in which the amount of opaque filler in layer 102 is limited, the black mask border formed from black masking layer 102 in inactive area IA may not be sufficiently opaque to serve as the exclusive light blocking structure for the border of display 14. Accordingly, one or more additional layers of light blocking structures may be formed in inactive area IA to supplement the masking function performed by black masking layer 102. An illustrative configuration of this type is shown in FIG. 8.

Figure 8:
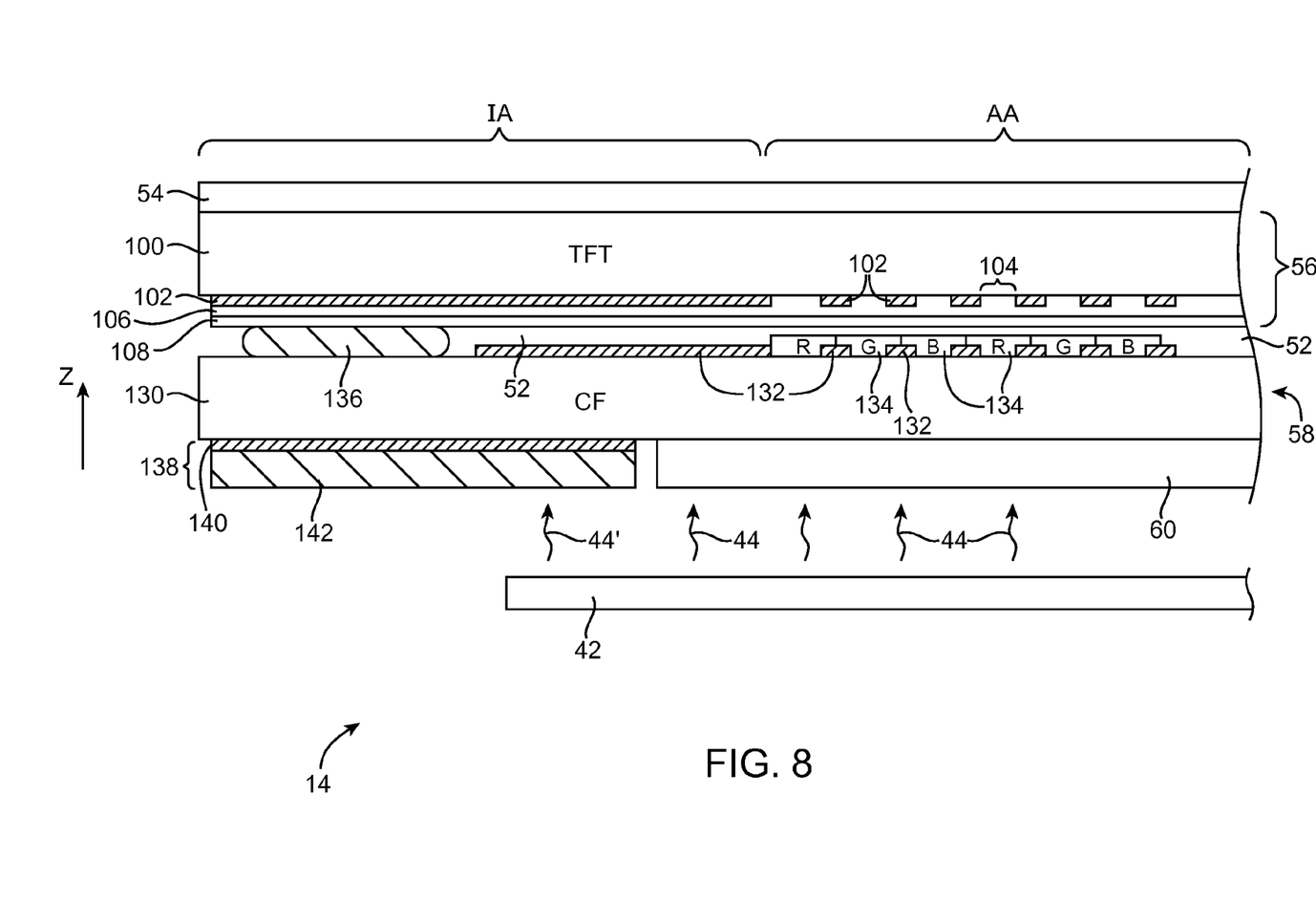
FIG. 8 is a cross-sectional side view of an illustrative display in accordance with an embodiment.

As shown in FIG. 8, display 14 may have an active area AA (e.g., a central rectangular active area filled with display pixels) and may have an inactive area IA that runs along the periphery of active area AA. The left-hand edge of the inactive area border region IA is shown in the illustrative portion of display 14 that is depicted in FIG. 8.

Thin-film transistor layer 56 is located above color filter layer 58. Thin-film transistor layer 56 includes substrate 100, black masking layer 102, spin-on glass planarization layer 106, and thin-film transistor circuitry such as thin-film transistor circuitry layer 108. Liquid crystal material 52 is interposed between thin-film transistor layer 56 and color filter layer 58. Sealant 136 (e.g., a rectangular ring of epoxy or other adhesive that runs around the rectangular periphery of display 14) may be used to seal liquid crystal material 52 within display 14. Color filter layer 58 has a transparent substrate such as substrate 130. Substrate 130 may be formed from a planar layer of clear glass, a transparent plastic layer, or other transparent substrate material. An array of color filter elements 134 may be formed on the surface of substrate 130. Color filter elements 134 may include red color filter elements R, blue color filter elements B, and green color filter elements G. Color filter elements 134 may be formed from colored photoimageable polymers. A layer of opaque masking material such as black photoimageable polymer layer 132 may form a black matrix in active area AA. The black matrix may have a grid shape with an array of rectangular openings. A respective color filter element 134 may be formed in each opening in the black matrix formed from opaque masking layer 132 on color filter substrate 130. Each color filter element 134 in the array of color filter elements on color filter layer 58 may be laterally aligned with a respective opening 104 in the array of openings in the black matrix formed from layer 102 on the inner surface of thin-film transistor substrate layer 100 (i.e., each display pixel in display 14 may have an opening 104, an associated display pixel electrode in layer 108, and an associated aligned color filter element 134 through which backlight 44 passes). As shown in FIG. 8, some of black masking layer 132 on substrate 130 may extend into inactive area IA and may help to block stray light from backlight 42.

Additional light blocking in inactive area IA may be provided by light blocking structures on the lower (outermost) surface of color filter layer substrate 130 (i.e., on the lower surface of color filter layer 58). As shown in FIG. 8, for example, opaque tape such as black tape 138 may be laminated to the lower surface of color filter layer substrate 130 in inactive area IA. Black tape 138 may have an opaque carrier such as carrier 142 and may have an adhesive layer such as adhesive layer 140.

Opaque carrier 142 may be formed from a flexible polymer layer such as a layer of triacetate cellulose, a layer of acrylic, a layer of polyethyleneterephthalate (PET), a layer formed from one or more other polymers, a fabric carrier, a conductive fabric carrier (e.g., a fabric tape substrate formed from conductive fibers such as metal fibers or metal-coated polymer fibers, a combination of conductive fibers and non-conductive fibers, etc.), a tape carrier having both a solid polymer layer and fibers, or other suitable tape layer or layers that serve as a carrier for adhesive such as adhesive layer 140. The materials of carrier 142 may be rendered opaque by incorporating opaque filler material (e.g., carbon black, titanium black, etc.) into the polymer materials of carrier 142 and/or may be rendered opaque by coating one or both surfaces of carrier 142 with an opaque material such as black ink. If desired, opaque material (e.g. carbon black, titanium black, etc.) may be incorporated into adhesive layer 140 (i.e., adhesive layer 140 may be formed from an opaque material such as black adhesive). Adhesive layer 140 may be a pressure sensitive adhesive or other adhesive and may be formed from a polymer such as acrylic or other suitable material. Adhesive layer 140 may, if desired, be formed using a conductive material.

With one suitable arrangement, black tape 138 may have an optical density of about 5.7 (e.g., 4 or more, 5 or more, 4-7, or other suitable optical density), may have a total thickness of about 0.045 mm (e.g., 0.03-0.07 mm, more than 0.02 mm, less than 0.1 mm, etc.), and may be formed from a conductive fabric carrier coated with a layer of black conductive acrylic adhesive. Conductive tape may be used to provide radio-frequency interference shielding and/or electrical grounding in addition to serving as light shielding. Tape 138 may be die cut to form a desired shape (e.g., a rectangular ring), may be formed in elongated strips, or may be otherwise shaped into a desired configuration for serving as an additional light blocking layer for inactive area IA of display 14. Tape 138 may be applied manually and/or using computer-controlled tape dispensing equipment.

As shown in FIG. 8, backlight 44 from backlight unit 42 may pass through polarizer 60 and the other layers of display 14 to serve as backlight in active area AA. In inactive area IA, it is desirable to block stray backlight such as illustrative stray backlight ray 44' in FIG. 8. This is accomplished using at least two light blocking structures in inactive area IA: tape 138 and the black border formed by black masking layer 102 on thin-film transistor layer 56. Layer 132 on color filter layer 58 may also assist in blocking stray light in inactive area IA.

Figure 9:
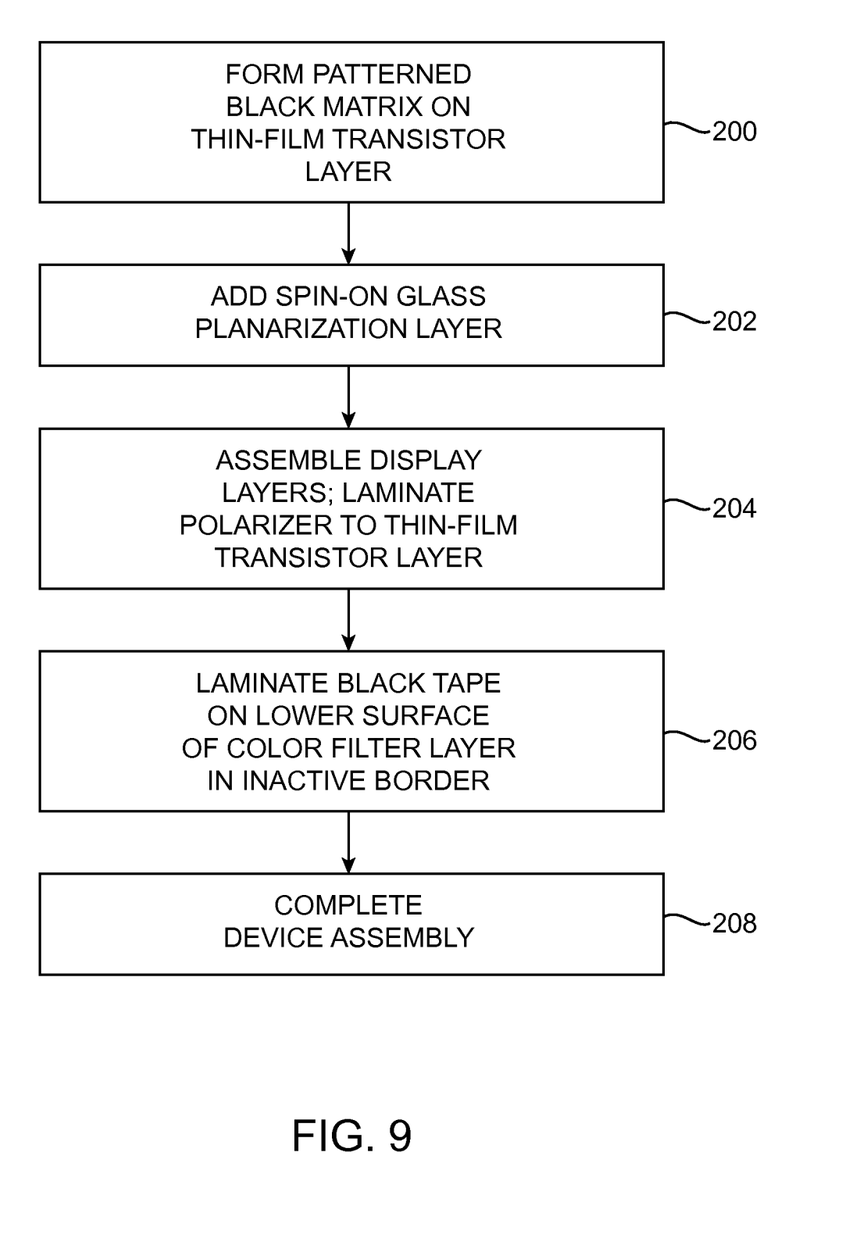
FIG. 9 is a flow chart of illustrative steps involved in forming an electronic device with a display in accordance with an embodiment.

Illustrative steps involved in forming a display such as display 14 of FIG. 8 are shown in FIG. 9. As shown in FIG. 9, during the fabrication of thin-film transistor layer 56, black masking layer 102 may be patterned on the lower surface of thin-film transistor layer substrate 100 (e.g., using photolithography). In active area AA, patterned black masking layer structures 102 may form a grid shaped black matrix defining an array of display pixel openings 104. In inactive area IA, black masking layer structures formed from layer 102 may form a black border layer that serves as a light blocking structure. At step 202, spin-on glass planarization layer 106 may be deposited on top of layer 102 to planarize layer 102 (e.g., by spinning on layer 106 using spin deposition techniques or using other suitable deposition techniques such as spraying techniques). In general, any suitable polymer, glass, or other clear material may be used in forming polarization layer 106. An advantage of using silicate based spin-on glass materials is that this type of material is compatible with dry etch processes used in patterning metal traces in thin-film transistor circuitry layer 108.

At step 204, display layers 46 (FIG. 5), films 70, and backlight 42 may be assembled to form display 14. In particular, liquid crystal layer 52 may be formed between color filter layer 58 and thin-film transistor layer 56, polarizer layers 54 and 60 may be laminated to the upper and lower surfaces of display 14, respectively, and other display assembly operations may be performed.

At step 206, black tape 138 may be attached to the lower surface of color filter layer 58 in inactive area IA (i.e., tape 138 may be applied to the lower surface of substrate 130 adjacent to polarizer 60). If desired, opaque masking structures such as black ink (e.g., polymer with black filler), metal tape, ink containing metal particles (i.e., metal ink), a layer of metal, other opaque materials, or combinations of two or more of these structures may be used in addition to or instead of black tape 138.

At step 208, device assembly operations may be completed and device 10 may be used to display images for a user. During operation, backlight structures 42 may produce backlight 44. In active area AA, backlight 44 is allowed to pass through color filter elements 134 on color filter layer 58 and associated openings 104 in the black matrix formed in the thin-film transistor layer 56. In inactive area IA, stray backlight from backlight structures 42 (see, e.g., stray backlight 44' of FIG. 8) is blocked by stray light blocking structures that include at least two stray light blocking layers. The innermost light blocking layer is formed form black tape 138. The outermost light blocking layer is formed from the border portion of black masking layer 102 on the lower surface of thin-film transistor layer substrate 100. Layer 132 on the upper surface of color filter layer 58 may also block some stray light in inactive area IA. Because tape 138 helps to block stray light, it is possible to form light blocking layer 102 from a thinner layer of black masking material than would otherwise be possible, ensuring that the black masking layer 102 and associated planarization layer 106 are not too thick.

The foregoing is merely illustrative and various modifications can be made by those skilled in the art without departing from the scope and spirit of the described embodiments. The foregoing embodiments may be implemented individually or in any combination.

What is claimed is:

1. A display having an active area and an inactive border area, comprising:
    display layers that include an array of display pixels in the active area, wherein the display layers include a color filter layer on a first display substrate and a thin-film transistor layer on a second display substrate; and
    light blocking structures in the inactive border area, wherein the light blocking structures include a first light blocking structure on the thin-film transistor layer and a second light blocking structure on the color filter layer, wherein the first light blocking structure comprises a patterned layer of polymer interposed between the thin-film transistor layer and the second display substrate, and wherein the patterned layer comprises openings that are free of the polymer.

2. The display defined in claim 1 wherein the second light blocking structure comprises tape.

3. The display defined in claim 2 wherein the tape comprises black tape.

4. The display defined in claim 3 wherein a portion of the patterned layer of polymer in the inactive area forms the first light blocking structure.

5. The display defined in claim 4 further comprising a backlight structure, wherein the color filter layer is interposed between the thin-film transistor layer and the backlight structure.

6. The display defined in claim 5 wherein the thin-film transistor layer further comprises a planarization layer on the patterned layer of polymer.

7. The display defined in claim 6 wherein the thin-film transistor layer further comprises a thin-film transistor and an inorganic buffer layer formed between the planarization layer and the thin-film transistor.

8. The display defined in claim 6 wherein the planarization layer comprises spin-on glass.

9. The display defined in claim 8 wherein the spin-on glass comprises silicate spin-on glass.

10. The display defined in claim 4 wherein the patterned layer of polymer comprises black polyimide.

11. The display defined in claim 1, wherein the second display substrate has first and second opposing surfaces and a thin-film transistor formed on the first surface, and wherein the first light blocking structure is interposed between the first surface and the thin-film transistor.

12. A display having an active area and an inactive area, the display comprising:
a thin-film transistor layer;
a color filter layer having first and second opposing surfaces;
a liquid crystal layer between the thin-film transistor layer and the color filter layer;
a backlight light guide plate that provides backlight for the display, wherein the color filter layer is interposed between the liquid crystal layer and the backlight light guide plate, wherein the thin-film transistor layer has a transparent substrate layer, wherein the thin-film transistor layer has a black masking layer on the transparent substrate layer in the active and inactive areas of the display, wherein the black masking layer is patterned in the active area, wherein the thin-film transistor layer has a spin-on glass planarization layer that covers the patterned black masking layer, wherein the thin-film transistor layer has a thin-film transistor circuitry layer on the spin-on glass planarization layer, wherein the color filter layer has a first light blocking layer on the first surface and a second light blocking layer on the second surface, and wherein the black masking layer overlaps the first and second light blocking layers in the inactive area.

13. The display defined in claim 12 wherein the first light blocking layer comprises black tape that blocks stray backlight from the backlight light guide plate.

14. The display defined in claim 13 wherein the active area includes an array of display pixels and the inactive area does not include display pixels and wherein the black tape is attached to the color filter layer in the inactive area.

15. The display defined in claim 14 further comprising:
an upper polarizer on the thin-film transistor layer; and
a lower polarizer, wherein the first surface is a lower surface of the color filter layer, and wherein the black tape is attached to the lower surface of the color filter layer adjacent to the lower polarizer.

16. The display defined in claim 14 wherein the patterned black masking layer has a thickness of less than 2 microns.

17. The display defined in claim 16 wherein the patterned black masking layer comprises a photoimageable polymer containing an opaque filler material.

18. The display defined in claim 12, wherein the thin-film transistor layer further includes an inorganic buffer layer that is interposed between the spin-on glass planarization layer and the thin-film transistor circuitry layer and that prevents chemicals from flowing into the spin-on glass planarization layer during formation of thin-film transistor structures in the thin-film transistor circuitry layer.

* * * * *